US010824163B2

(12) United States Patent
Einecke et al.

(10) Patent No.: US 10,824,163 B2
(45) Date of Patent: Nov. 3, 2020

(54) METHOD FOR GENERATING A REPRESENTATION OF A WORKING AREA OF AN AUTONOMOUS LAWN MOWER AND AUTONOMOUS LAWN MOWER SYSTEM

(71) Applicant: HONDA RESEARCH INSTITUTE EUROPE GMBH, Offenbach/Main (DE)

(72) Inventors: Nils Einecke, Offenbach (DE); Sven Rebhan, Offenbach (DE); Mathias Franzius, Offenbach (DE); Jörg Deigmöller, Offenbach (DE); Keiji Muro, Saitama (JP)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 292 days.

(21) Appl. No.: 15/918,028

(22) Filed: Mar. 12, 2018

(65) Prior Publication Data

US 2018/0284806 A1 Oct. 4, 2018

(30) Foreign Application Priority Data

Mar. 28, 2017 (EP) .................................... 17163251

(51) Int. Cl.
*A01D 34/00* (2006.01)
*G05D 1/00* (2006.01)
(Continued)

(52) U.S. Cl.
CPC ......... *G05D 1/0274* (2013.01); *A01D 34/008* (2013.01); *G05D 1/0088* (2013.01);
(Continued)

(58) Field of Classification Search
CPC ............. A01D 34/008; A01D 2101/00; G05D 1/0274; G05D 1/0265; G05D 1/0268;
(Continued)

(56) References Cited

U.S. PATENT DOCUMENTS 10,188,029 B1 * 1/2019 Brown ................... G05D 1/027
2004/0181896 A1 * 9/2004 Egawa ................. G05D 1/0219
15/319
(Continued)

FOREIGN PATENT DOCUMENTS

WO WO 2016/097900 A1 6/2016
WO WO-2017037547 A1 * 3/2017 ........... G06T 11/203

OTHER PUBLICATIONS

European Search Report dated May 26, 2017 corresponding to European Patent Application No. 17163251.6.

*Primary Examiner* — Behrang Badii
*Assistant Examiner* — Hossam M Abd El Latif
(74) *Attorney, Agent, or Firm* — Squire Patton Boggs (US) LLP

(57) ABSTRACT

A method and a system can generate a representation of a working area of an autonomous lawn mower. The system can include an autonomous lawn mower and a base station, and a boundary wire forming a closed loop which can be connected with the base station. The lawn mower and the base station interact such that the lawn mower can determine whether it is in its home position, a predetermined position that is taken when the mower returns to the base station. The lawn mower further includes a memory, for storing values from a movement sensor. A trajectory is generated based on the values, wherein a processor is configured to calculate an error between the position and orientation according to the trajectory and the home position. This total position error
(Continued)

and total orientation error is then used to correct the position and corresponding orientations of the trajectory.

15 Claims, 4 Drawing Sheets

(51) Int. Cl.
  *G05D 1/02* (2020.01)
  *A01D 101/00* (2006.01)
(52) U.S. Cl.
  CPC ......... *G05D 1/0219* (2013.01); *G05D 1/0221* (2013.01); *G05D 1/0265* (2013.01); *G05D 1/0268* (2013.01); *A01D 2101/00* (2013.01); *G05D 1/0257* (2013.01); *G05D 2201/0208* (2013.01)

(58) Field of Classification Search
  CPC .. G05D 1/0221; G05D 1/0219; G05D 1/0088; G05D 2201/0208; G05D 1/0257
  USPC .......................................................... 701/25
  See application file for complete search history.

(56) References Cited

U.S. PATENT DOCUMENTS

| | | | |
|---|---|---|---|
| 2005/0085947 A1* | 4/2005 | Aldred | G05D 1/0274 700/253 |
| 2012/0083961 A1* | 4/2012 | Sato | G05D 1/027 701/25 |
| 2013/0218397 A1 | 8/2013 | Griffini et al. | |
| 2016/0165795 A1 | 6/2016 | Balutis et al. | |
| 2018/0359916 A1* | 12/2018 | Zhou | G05D 1/027 |

* cited by examiner

METHOD FOR GENERATING A REPRESENTATION OF A WORKING AREA OF AN AUTONOMOUS LAWN MOWER AND AUTONOMOUS LAWN MOWER SYSTEM

BACKGROUND

Field

The invention regards a method for generating a representation of a working area of an autonomous lawn mower and an autonomous lawn mower system including an autonomous lawn mower, a base station and a boundary wire, extending along an outer boundary of the working area for the autonomous lawn mower.

Description of the Related Art

The market for autonomous lawn mowers is growing each year. Autonomous lawn mowers are self propelled and can perform lawn mowing without direct interaction with a user, once the configuration is set up. This increases the comfort for garden owners drastically. However, the basic concept has not changed too much for several years now. Basically, autonomous lawn mowers move randomly in a limited environment enclosed by an electric boundary wire which thus defines a working area. The autonomous lawn mower moves straight until the boundary wire is detected, then orientation of the mower is changed randomly and the mower starts a further straight movement. Although this has proven to be simple and very robust it is not the most efficient behavior. For more efficiency, however, more intelligence in the autonomous mowers is desirable.

When an autonomous lawn mower system is installed in a garden the autonomous lawn mower has no information about the garden and thus the edges or boundaries of its working area. Autonomous lawn mowers typically are driven by electric motors and are equipped with a rechargeable battery. A base station is not only used to supply a voltage to the boundary wire but is also configured as a charging unit. The mower can drive into such base station which is usually built like a small garage for weather protection. Inside the base station there is provided at least a charging terminal. The mower therefor can enter the base station and connect to the charging terminal. When the mower is connected to the charging terminal, the mower is in the home position and, as the base station and thus also the charging terminal are stationary, in the home position the autonomous lawn mower is always in the same position and always has the same orientation.

In order to return to the base station for charging, when the battery is low, the mower starting with an arbitrary position and orientation drives straight until it finds the boundary wire and then follows the boundary wire until the base station is reached. It is also able to drive around the garden by following the boundary wire in order to perform a border cutting of the grass. The mower is equipped with sensors that allow detecting the proximity of the boundary wire. The sensor signal is analysed and the electric motors of the mower are then controlled such that the mower follows the boundary wire until the base station is reached.

As mentioned above it would be desirable to have knowledge about the environment so that the electric motors of the mower can be controlled such that the mower fulfils its function of mowing not by driving around randomly but following a mowing pattern that covers the working area. By doing so it can be avoided that the same portion of the working area is mowed again whereas other portions of the working area never have been visited.

U.S. Pat. No. 7,085,624 B2 describes an autonomous vacuum cleaner that moves along walls (or obstacles) in order to map a working area boundary. It is also stated that the method for mapping the working are can be used for autonomous vehicles using any kind of pre-existing barrier or any form of barrier positioned especially for use of the autonomous machine. It is suggested to detect the revisiting of points for performing a loop closure and thus reduce an error in the mapping.

A problem of the known approach is that there does not exist a dedicated starting point and end point for the movement of the machine along the boundary. The machine of U.S. Pat. No. 7,085,624 B2 follows an arbitrary barrier but may start anywhere. Consequently is determined from the collected measured position and orientation changes whether the machine already visited the current location. But this requires that the machine travels along the boundary redundantly without increasing the quality of the analysis but only to find out if the loop is already closed. According to the environment this can need a major part of the boundary. In particular for outdoor applications this can cause problems, because driving along a fence can be a very long distance until a revisited point can be detected. In case the fence describes a circle, this approach will never be successful. Furthermore, the determination algorithm needs a lot of computation and therefore expensive hardware equipment is needed which in addition is rather power consuming It is thus desirable to reliably create an internal metric representation of a boundary wire of an autonomous lawn mower system and thus of the garden shape while having low hardware requirements and no need to redundantly drive along the border for recognising a closed loop.

The method and system according to the independent claims provide a solution to the above stated problem.

SUMMARY

The invention regards a method for generating a representation of a working area of an autonomous lawn mower and a system including an autonomous lawn mower with at least one movement sensor, a base station and a boundary wire forming a closed loop and being connected with the base station. The autonomous lawn mower can determine when it leaves its home position and when it has returned. Such determination may be made based on the onset of its movement when leaving or the deceleration followed by a standstill period after returning. The home position is a predetermined position that is always taken when the mower returns to the base station, for example for charging or pausing. The autonomous lawn mower further comprises a memory, for storing measured values from its at least one movement sensor. In its processor, a trajectory is generated based on the measured values, wherein the processor is further configured to calculate a total error between the position and orientation according to the calculated trajectory and the home position after reaching the home position again. This total position error and total orientation error is then used to correct the position and corresponding orientations of the calculated trajectory.

The method is started by positioning the autonomous lawn mower in a home position at the base station. This can either be made by a user when the system is put into operation for the first time for example, but it is also possible and even preferred, to use the inherent capability of the autonomous lawn mower to find its way to the base station. Then, when the process of creating a map of the working area is started, the self propelled mower leaves the home position and determines that the home position has been left. The mower is then controlled to follow the boundary wire until the base station is reached again. While moving, the mower records measured values from movement sensors. This recordation is started already before the home position is left to ensure that the starting point is recorded as well. Recording the values of the movement sensors lasts until the arrival in the home position in the end is determined. The mower determines that the home position in the base station is reached again. Thus, the mower has knowledge that the starting position and the end position are the same. The processor calculates a trajectory of the autonomous lawn mower based on the recorded measured values. Pairs of values for the position and the corresponding orientation define the trajectory. These positions and/or corresponding orientations are then corrected by a position error and/or an orientation error respectively. The position error and the orientation error is derived from the total position error and the total orientation error respectively which is the difference between the calculated end position and orientation of the trajectory and the home position. The corrected pairs of positions and corresponding orientations are stored as representation of the working area.

The solution according to the invention uses the capability of the mower to travel along the boundary wire to find its way back to the base station in order to generate a closed loop movement. Contrary to the approach known from the state of the art it is not necessary to determine a revisited location. The mower recognizes when it is in the home position again without comparing trajectories. This does not only reduce the processing load but also reduces the time needed until the process of generating a map of the boundary of the working area can be started. Errors that might occur when the revisited location is determined, e.g. when different portions of the boundary are very similar, can be avoided. Such similarities can often occur in outdoor environments. Thus, the invention provides a reliable and quick solution for generating a map of a working environment of an autonomous lawn mower.

Advantageous aspects are detailed in the dependent claims.

The determination of leaving the home position and returning to the home position again may be made based on an interaction between the base station and the autonomous lawn mower, e.g. by a miniature switch that is operated only when the mower is in the home position or by analyzing that a charging connection is interrupted/reconnected.

According to one advantageous aspect, the correction of orientations along the trajectory is performed before correction of the positions along the trajectory is performed on positions calculated based on the corrected orientations. This improves the error correction significantly, because the stronger effect of a rotation error. Such error concerning the rotation or orientation of the mower integrates for the position. By correcting the orientation error first, this integration of an error when positions are calculated can be avoided.

The trajectory is represented as a polygon, preferably. Using a polygon reduces the computing resources and makes it possible to reduce hardware requirements again.

The polygon is advantageously reduced by a per se known polygon simplification algorithm such as Douglas-Peucker algorithm, Reuman-Witkam algorithm and Opheim algorithm, wherein it is particularly preferred that the degree of simplification depends on an estimated accuracy of the generated trajectory.

According to a further aspect, the correction of the position is done dependent on a traveled distance from the start and the orientation correction is done dependent on an accumulated absolute rotation. This takes into account that on the one side a rotational error occurs only when a rotation is performed and that on the other side the position error continuously integrates with the traveled distance. Thus, the overall error correction can be improved.

The invention can particularly be used during configuration of the autonomous lawn mower, which may be done automatically on the basis of the representation of the working area. Additionally or alternatively the length of the boundary wire can be set automatically.

In case that the representation shall be a 3D-map, the measured values preferably include data of a g-sensor (acceleration sensor) and based on the g-sensor data and the trajectory a 3D-representation is created.

Furthermore, it is preferred that the movement along the boundary wire and recordation of measured values is repeatedly performed and for each repetition a corresponding trajectory is generated and that the trajectories are then merged to generate the representation of the working area. Such repeatedly performed movement and analysis of the measured values has the advantage that the influence of random errors is reduced. When repetitively moving along the boundary wire it is particularly preferred that the movement is conducted clock-wise and counter-clock-wise. It is to be noted that for every repetition the start point and the end point is the home position so that for each repetition a trajectory can be calculated.

An easy way to perform the merging is selecting the trajectory having the smallest total position error and total orientation error when the base station is reached again.

The orientation may be calculated based on differential drive equations or based on a rotation sensor, e.g. an inertial measurement unit IMU.

The representation of the working area is transferred to a remote terminal for further processing. Such remote terminal may particularly be a mobile device that holds an application suitable for controlling, configuring, monitoring, supervising etc. the autonomous lawn mower.

BRIEF DESCRIPTION OF THE DRAWINGS

Further aspects and details will become apparent from the following description and the drawings in which Preferred examples for the at least one movement sensor are wheel rate counters, IMUs, compass, g-sensor and visual sensors.

DETAILED DESCRIPTION

Figure 1:
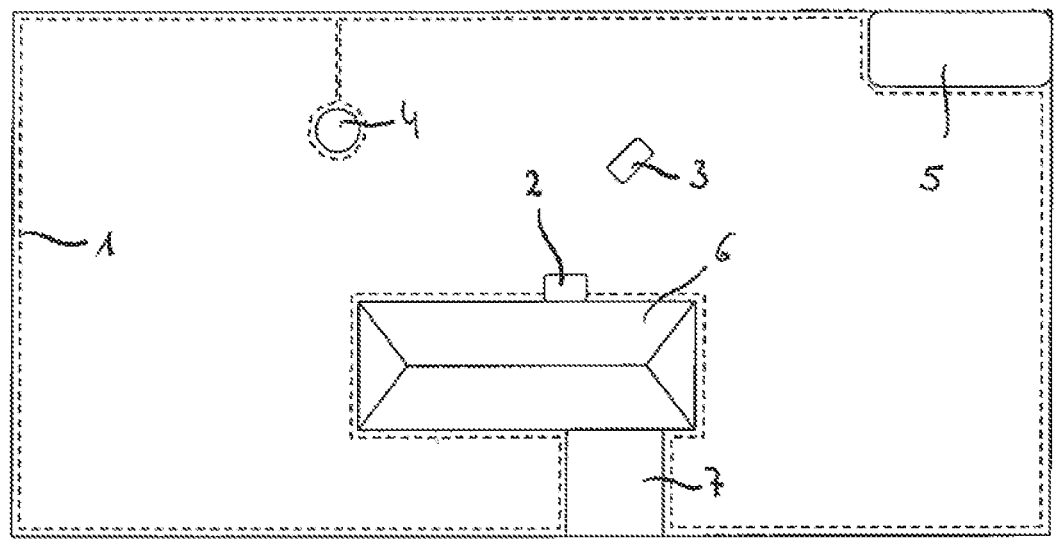
FIG. 1 shows a schematic of a system according to the invention.

FIG. 1 shows a typical situation for an autonomous lawn mower system. Such systems typically have an electric boundary wire 1 installed in order to define their working area. The boundary wire 1 starts and ends at a base station 2. An autonomous lawn mower 3 has special electromagnetic sensors to detect the wire 1 and is programmed such that it never leaves its enclosure as defined by the boundary wire 1. Furthermore, the autonomous lawn mower 3 has the ability to follow the wire 1 in order to return to the base station or to do a border cutting. For charging the autonomous lawn mower 3 the base station 2 comprises charging unit which is not shown in the drawing, but which is configured such that when the mower 3 returns to its home position it connects automatically to the autonomous lawn mower 3. This automatic connection may be used in the present invention to determine when the autonomous lawn mower 3 leaves its home position or reaches the home position again.

As can be seen in FIG. 1 the boundary wire runs along the edge of an area to be mowed by the autonomous lawn mower 3. It goes around a tree 3, along a flower bed 5, a house 6 and a car park 7 so that the run of the boundary wire gives information on the working area. Knowledge about this run of the boundary wire thus immediately gives a representation of the working area. Consequently determination of a trajectory of the mower's movement along the boundary wire for an entire loop gives also the desired information.

The present invention assumes that an initial setup of the system was successfully performed which means that the boundary wire is laid along the edges of the working area as shown in FIG. 1, that the mower is charged and that it is able to find its way along the boundary wire 1 to move back to the base station 2.

Figure 2:
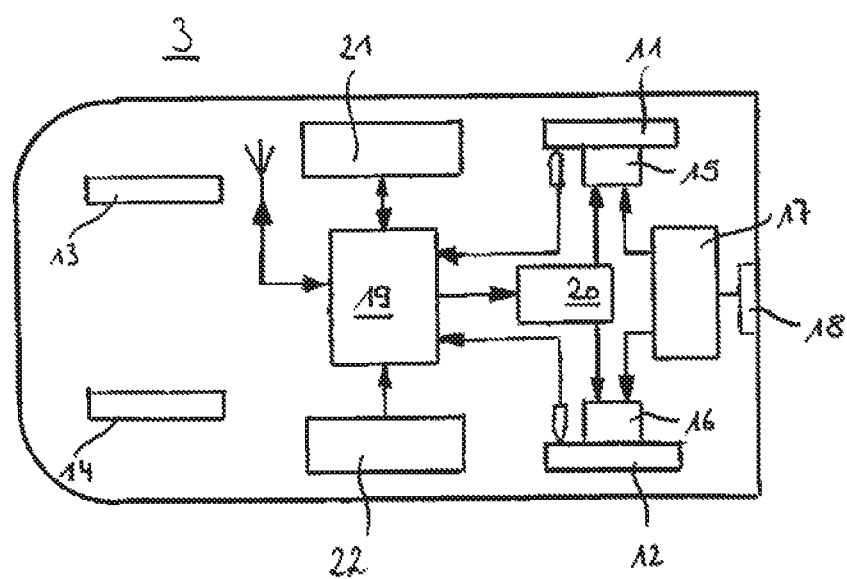
FIG. 2 shows block diagram of an autonomous lawn mower according to the invention.
Figure 3:
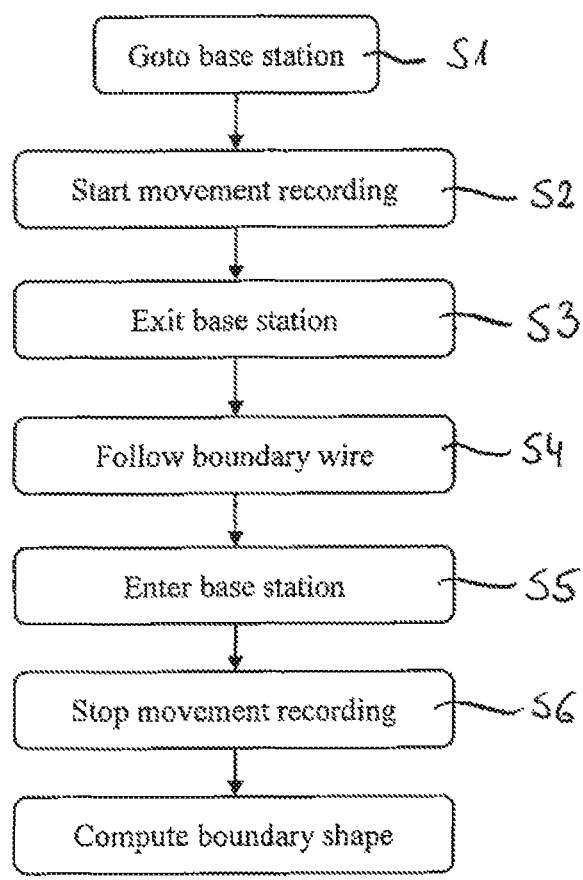
FIG. 3 is a simplified flowchart showing the main steps of the present invention, FIGS. 4a), 4b), and 4c) show an actual course of a boundary wire, a calculated trajectory based on measurement values and a trajectory based on corrected positions and orientations, and FIGS. 5a) and 5b) show a schematic of the use of a g-sensor.

FIG. 2 shows a schematic of an autonomous lawn mower 3 according to the invention. The autonomous lawn mower 3 comprises a pair of rear wheels 11, 12 which are driven by respective electric motors 15, 16. Furthermore the mower 3 comprises front wheels 13, 14 which are not driven but may freely follow a movement of the mower in response to the relative rotation of the rear wheels 11, 12. Thus, the direction of the mower 3 is controlled by controlling the rotational speed of the rear wheels 11, 12 relative to each other.

The electric motors 15, 16 are controlled by a motor controller 20 and supplied with electric energy from a rechargeable battery 17. The battery 17 may be recharged via a charging interface 18 to which a charging unit of the base station 2 automatically connects when the mower 3 reaches its home position.

The controller 20 is furthermore connected to a processor 19 which is configured to perform the method steps necessary for generating the representation of the working area. The processor 19 is connected to movement sensors 22, 23 and 24 but also to a memory 21. Sensors 23 and 24 are in particular wheel rate sensors which preferably detect the wheel rates of the rear wheels 11, 12. The wheel rate sensors could also be arranged at the front wheels if the differential drive equations were corrected accordingly. In this case sensor errors due to wheel slip would be reduced. Sensors 22 may be IMUs (inertial measurement units), a g-sensor, LIDAR- or radar-sensors. Thus, when moving, the processor 19 receives measured values of all of the sensors provided in the lawn mower 3 and stores these values in the memory 21. Based on these values a trajectory of the mower 3 can be calculated by the processor 19 and the positions and orientation of the mower 3 along the trajectory can be corrected in order to generate the representation of the working area as it will be described later in detail.

The generation of the representation of the working area is shown in a simplified flowchart in FIG. 2. First, if not already the case, in step S1, the mower 3 returns to its base station 2. When the mower 3 has returned to the base station 2 it will automatically manoeuvre into its home position and determine that the home position is reached. The home position may be any predetermined position that is in a fixed relation and has a known relative orientation to the boundary wire 1. Of course, it is preferred that the home position is the position in which the battery of the mower 3 is charged. In step S2 the generation of the map is started and thus recordation of the mower's 3 movement is started. This means that the home position, which is the position the mower still is in, is stored in the memory 21 and can thus be compared to a position and orientation the mower allegedly has, according to the trajectory calculation performed later on. Then, in step S3, the mower 3 exits the base station 2 (leaves the home position which is recognised by the mower 3) and follows the boundary wire 1 in step S4 until the mower 3 reaches the base station 2 again (step S5).

During this movement alongside the boundary wire 1 the movement of the mower 3 is recorded by recording the data received by from the sensors. This means that the values that are obtained by the movement sensors are stored in a memory. Favourable is the usage of wheel odometry and IMU as typically these sensors are part of the autonomous lawn mower 3 already. In step S5 the mower 3 returns into its base station 2, manoeuvres into its home position and determines that the home position is reached again. After the home position is reached again, the recordation of the movement is stopped in step S6. Based on the recorded measured values, a representation of the working area of the autonomous lawn mower 3 is then calculated in step S7 as will be explained hereinafter in greater detail.

In a straightforward fashion the mower 3 just records wheel odometry data, i.e. wheel rate or velocity of the left 12 and the right wheel 11, and computes a relative movement from this. Most autonomous mowers 3 have a differential drive. Thus, the 2D movement $(\Delta x, \Delta y, \Delta \theta)$ in an x-y-plane for each time step $\Delta t$ can be computed by:

$$\begin{bmatrix} \Delta x \\ \Delta y \\ \Delta \theta \end{bmatrix} = \begin{bmatrix} \cos(\omega \Delta t) & -\sin(\omega \Delta t) & 0 \\ \sin(\omega \Delta t) & \cos(\omega \Delta t) & 0 \\ 0 & 0 & 1 \end{bmatrix} \begin{bmatrix} R\sin(\theta) \\ -R\cos(\theta) \\ 0 \end{bmatrix} + \begin{bmatrix} -R\sin(\theta) \\ R\cos(\theta) \\ \omega \Delta t \end{bmatrix}$$

$$R = \frac{l}{2} \frac{V_r + V_l}{V_r - V_l}$$

$$\omega = \frac{V_r - V_l}{l}$$

where $v_l$ and $v_r$ are the left and right wheel velocity. $\theta$ is the orientation of the mower, and w the angular velocity.

Figure 4:
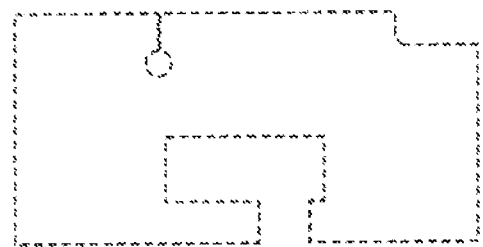
Figure 4:
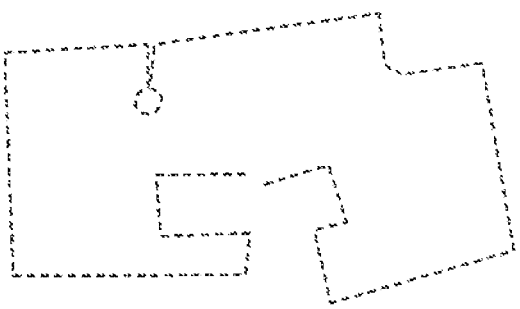
Figure 4:
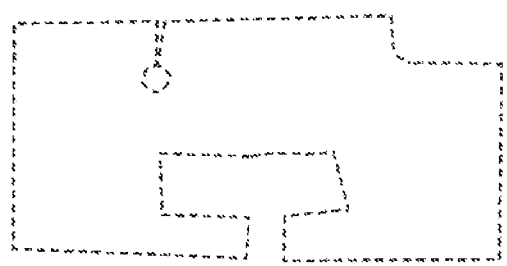

The error of the pose $(x,y,\theta)$ estimation by means of wheel odometry increases over time (travel distance). This phenomenon is called drift. FIGS. 4a)-4c) show a schematic example of how the drift affects the estimated movement and thus also the estimated boundary wire shape and also the correction achieved by the present invention.

FIG. 4a) shows the actual arrangement of the boundary wire and thus the trajectory as it should be calculated assuming that the error in the system is zero. In the illustrated example the mower 3 moved in clock-wise direction. The trajectory calculated from the measured values is depicted in FIG. 4b). At the beginning the calculated trajectory is very accurate but further down the wire 1 the calculation accumulates more and more errors. In the end (when the mower 3 is back at the base station 2) there is a total position error and a total orientation error between the calculated start and end position of the trajectory which are both located at the home position and hence should actually be identical. It is caused by the drift in the trajectory calculation. Usually, the drift error is about 1-3%, i.e. after 100 m driving the position error is 1-3 m. Additionally, wheel odometry is subject to heavy slip in the garden scenario so that the estimated movement is not very precise. This is particularly true if the wheel rate sensors are associated with the driven rear wheels 11, 12. As mentioned above, there are two kinds of errors, position errors and rotation (orientation) errors. The first is less critical because its influence on future positions is limited. In contrast, rotation errors are more severe because their influence on position errors in the future increases over time (or travel distance). Assume at one point in time the movement estimation has an error of 1 degree. Even if from now on there would be no further estimation error, the position error would still increase over time because the estimated orientation of the mower was wrong and all subsequent position changes will be done in the wrong direction. The effect of the rotational errors can be seen in FIG. 4*b*) as the skewing of the map, as if it has been bent outwards.

According to the invention, the drift problem is alleviated using loop closure as it is per se already known. The idea is to have a separate mechanism which is able to detect that the mower 3 is at a position at which it has been before. Knowing that two measured positions should actually be the same can be used to compute the residual or total error, i.e. the difference in position (and potentially also orientation) of these points. Then the error of positions and orientations along the trajectory can be corrected. Of course some errors remain but the overall trajectory estimation is strongly improved. FIG. 4*c*) shows schematically how the loop closure improves the calculated trajectory shown in FIG. 4*b*). Some errors in the map shape and position remain; however, overall the error is strongly reduced.

According to the invention the capability of the mower 3 to return to a location with a well defined position and orientation is used. Further the mower 3 is capable to determine when this well defined home position is reached or left. Since the mower 3 drives along the boundary wire 1 starting and ending at the base station 2 a visual loop closure detection is not necessary because the autonomous lawn mower 3 knows that it is standing in the base station 2 again and, hence, knows the estimated position should be the same as the starting position.

One possible and simple way of correcting the odometry data, and thus the calculated positions and orientations along the trajectory, is to equally distribute the total position error and total orientation error over the mapped trajectory. The total position error is the difference between the actual starting point/end point and the calculated end point. Actually, this should be zero because after driving along the boundary wire 1 the mower 3 stands again in the station. Although this equal position and orientation error distribution improves the map quality, it is not optimal. According to one aspect of the invention the error correction is thus not distributed equally over the traveled distance.

It is rather preferred that first, the rotation error is corrected. The base station 2 can only be entered from one direction and the final orientation is the same as the start orientation. As can be seen in the formula above, the computation of the orientations ($\Delta\theta$) is independent of the computation of the position ($\Delta x$ and $\Delta y$). Second, the positions of the mower 3 are calculated with the corrected orientations. Then, finally the positions themselves are corrected.

In addition to performing error correction in two successive steps it is preferred not to distribute the errors equally over all measured positions and orientations but weight each position (orientation) according to some criteria. In one variant for the orientation correction at first the orientation changes are summed up, i.e. the rotation speed, $\Delta\theta$ in an absolute fashion and each orientation change (rotation speed) is corrected according to its contribution to the overall rotation $\theta_s$:

$$\theta_s = \sum |\Delta\theta|$$

$$\Delta\theta_{corr} = \Delta\theta - \frac{|\Delta\theta|}{\theta_E}(\theta_{end} - \theta_{start})$$

The weighted error correction leads to a much better distribution of the orientation error, especially when there are only a few instances of orientation change. For example when the garden has a rectangular shape, there are essentially only four points where the orientation changes. Thus, it is very likely that the orientation errors arose here. Other weighting criteria like acceleration, the mismatch between wheel odometry and IMU measurements or a weighted combination of multiple criteria can also lead to meaningful distribution of the error.

In an analogous fashion, the position errors are corrected with respect to the overall traveled distance ($d_s$).

$$d_s = \sum \Delta d = \sum \|(\Delta x, \Delta y)\|$$

$$\Delta x_{corr} = \Delta x - \frac{\Delta d}{d_s}(x_{end} - x_{start})$$

$$\Delta y_{corr} = \Delta y - \frac{\Delta d}{d_s}(y_{end} - y_{start})$$

With the above described correction scheme the motion estimation error (error of the calculated trajectory) can be strongly reduced. Again, other weighting criteria like speed, acceleration, the mismatch between wheel odometry and IMU measurements or a weighted combination of multiple criteria can also lead to a meaningful distribution of the error.

Another way of reducing the error is to let the mower do the border following multiple times and to merge the estimations. For each repetition of the movement along the boundary wire 1 a separate trajectory is calculated. In particular, it is advantageous to let the mower 3 drive both in clock-wise and counter-clock-wise direction. One efficient way of merging the is selecting the best trajectory calculation based on the smallest total error (position and/or rotation error) which is found to be a robust and simple way of error reduction.

It is also possible to have an additional error reduction by integrating further sensors 22. One favorable mean is to use a rotation sensor, i.e. an IMU, for directly estimating the rotation instead of computing it by the differential drive equations. The advantage of a rotation sensor is that it is not affected by wheel slip which occurs quite often in garden scenarios. Furthermore, the drift in the rotation sensor is closer to a Gaussian distribution which makes the weight based error distribution more effective. For integrating the measured values of a rotation sensor into the overall estimation, the measures just replace the rotation estimation equations for $\Delta\theta$ in the differential drive equations.

In order to keep the required computing resources low a polygon description (a set of connected points) of the boundary wire 1 is used. In contrast to a full 2D or 3D representation of other state-of-the-art approaches this leads to a representation with a low memory footprint. Directly having one polygon point for each measurement made during the boundary-wire-follow-movement might still lead to several thousand points for standard garden sizes. This can be reduced by using techniques known from the state-of-the-art for polygon simplification. For example Douglas-Peucker, Reumann-Witkam or Opheim algorithm can be used. These methods can easily reduce the number of points to a few hundred. The simplification can be done by either defining a desired number of points or a maximal acceptable error. It is favorable to use the maximal acceptable error and set it dependent on the expected error of the odometry because the polygon is created by the odometry anyway and therefore does not need to represent a higher accuracy.

In addition to the position (x,y) the polygon points may also store the orientation $\theta$ of the mower at that point during boundary recording or the relative orientation $\Delta\theta$ between the polygon point and its neighbor polygon point.

Figure 5:
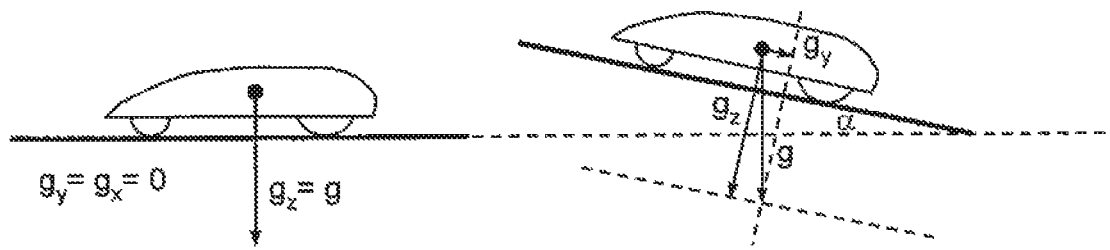

As described so far, the boundary shape estimation will be represented in the 2D space. This means that slopes are not represented correctly but are inherently projected onto a 2D plane. For many gardens this is good enough because the working area itself is always a 2D surface. However, there might be cases where a 3D position would be beneficial, e.g. for path planning. For enriching the 2D motion estimation with height data sensors may be used that is already installed in the mower 3 for other reasons. Autonomous mowers often have a g-sensor for safety reason, e.g. for detecting roll-over. This g-sensor can be exploited to estimate the 3D orientation of the mower 3 with respect to the earth's gravity. FIGS. 5*a*) and 5*b*) illustrate the information that can be derived from the g-sensor. From this information estimated 2D pose changes can be correctly located in 3D space. For example if the mower 3 is going uphill the forward movement becomes a combined forward and upward movement. The previously described technique for error correction after loop closure at the base station 2 works analogously for the 3D data.

Having the polygon representation of the boundary shape is very sparse as compared to a full 2D or 3D representation but it already allows for many additional intelligent functions of autonomous lawn mower 3. Some of the applications that become possible when the mower 3 has knowledge on the working area are:

Automatic configuration of the lawn mower: In currently sold mowers the user at least has to define the boundary wire length and the mowing area so that the mower can for example infer a reasonable mowing schedule. With knowledge on the boundary shape which is the representation of the environment and thus the corrected trajectory, the wire length and working area size can easily be computed, e.g. as polygon length and polygon area. Thus, the mower 3 needs no user interaction whatsoever but can directly start working after the installation of the wire.

Transmission of the polygon to a remote terminal, for example a smart device of the user: Here the boundary can be displayed as a 2D map for example as part of an app for configuring the device. The displayed map would give the user a better personalized impression of the app visualizations.

The invention claimed is:

1. A method for generating a representation of a working area of an autonomous lawn mower, the method comprising the steps of:
   positioning the autonomous lawn mower in a home position at a base station;
   leaving the home position and determining that the home position has been left;
   following a boundary wire until the base station is reached again;
   recording measured values from movement sensors of the autonomous lawn mower while moving;
   maneuvering the autonomous lawn mower into the home position and determining that the home position in the base station is reached again on the basis of an interaction between the base station and the autonomous lawn mower;
   generating a trajectory of the autonomous lawn mower on the basis of the recorded measured values, the trajectory being defined by positions and corresponding orientations of the autonomous lawn mower;
   correcting the positions and corresponding orientations by a position error and an orientation error respectively in two successive computational steps, wherein correction of orientations along the trajectory is performed before correction of the positions along the trajectory is performed on positions calculated on the basis of the corrected orientations, and
   wherein correction is performed by weighting each orientation and position according to some criteria, including orientation changes, acceleration or a combination of multiple criteria;
   storing the corrected trajectory as the representation of the working area.

2. The method according to claim 1, wherein
   leaving the home position is determined based on an interaction between the base station and the autonomous lawn mower.

3. The method according to claim 1, wherein
   the trajectory is represented as a polygon.

4. The method according to claim 3, wherein
   the polygon is reduced by a polygon simplification algorithm of the group consisting of Douglas-Peucker algorithm, Reumann-Witkam algorithm and Opheim algorithm.

5. The method according to claim 4, wherein
   the degree of simplification depends on an estimated accuracy of the generated trajectory.

6. The method according to claim 1, wherein
   the correction of the position is done dependent on a traveled distance from the start and the orientation correction is done dependent on an accumulated absolute rotation.

7. The method according to claim 1, wherein
   a configuration of the autonomous lawn mower is done automatically based on the representation of the working area or a length of the boundary wire is set automatically.

8. The method according to claim 1, wherein
   the measured values include data of a g-sensor and based on the g-sensor data and the trajectory a 3D-representation is created.

9. The method according to claim 1, wherein
   the movement along the boundary wire and recordation of measured values is repeatedly performed and for each repetition a corresponding trajectory is generated and the trajectories are then merged to generate the representation of the working area.

10. The method according to claim 9, wherein the repetitions of the movement along the boundary wire include clock-wise and counter-clock-wise movements.

11. The method according to claim 9, wherein the merging is done by selecting the trajectory having the smallest total position error or total orientation error when the base station is reached again.

12. The method according to claim 1, wherein the orientation is calculated based on differential drive equations or based on a rotation sensor, e.g. an inertial measurement unit IMU.

13. The method according to claim 1, wherein the representation of the working area is transferred to a remote terminal for further processing.

14. A system including an autonomous lawn mower with at least one movement sensor, a base station and a boundary wire forming a closed loop and being connected with the base station, the autonomous lawn mower and the base station being capable to interact with each other such that the autonomous lawn mower can determine whether it is in its home position, the autonomous lawn mower further comprising a memory, for storing measured values from its at least one movement sensor and a processor to generate a trajectory based on the measured values, wherein the processor is further configured to calculate a total error between the position and orientation according to the trajectory and the home position after reaching the home position again and to correct the position and corresponding orientations of the trajectory by a position error and an orientation error respectively in two successive computational steps, wherein correction of orientations along the trajectory is performed before correction of the positions along the trajectory is performed on positions calculated on the basis of the corrected orientations, and wherein correction is performed by weighting each orientation and position according to some criteria, including orientation changes, acceleration or a combination of multiple criteria.

15. The system according to claim 14, wherein the at least one movement sensor is from the group of wheel rate counters, IMUs, compass, g-sensor and visual sensors.

* * * * *